US011893495B2

(12) United States Patent
Kadayam Viswanathan et al.

(10) Patent No.: US 11,893,495 B2
(45) Date of Patent: Feb. 6, 2024

(54) DUAL NEURAL NETWORK ARCHITECTURE FOR DETERMINING EPISTEMIC AND ALEATORIC UNCERTAINTIES

(71) Applicant: Schlumberger Technology Corporation, Sugar Land, TX (US)

(72) Inventors: Ravinath Kausik Kadayam Viswanathan, Sharon, MA (US); Lalitha Venkataramanan, Lexington, MA (US); Augustin Prado, Lausanne (CH)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 667 days.

(21) Appl. No.: 16/948,183

(22) Filed: Sep. 8, 2020

(65) Prior Publication Data
US 2021/0073631 A1   Mar. 11, 2021

Related U.S. Application Data

(60) Provisional application No. 62/896,339, filed on Sep. 5, 2019.

(51) Int. Cl.
| | | |
|---|---|---|
| *G06N 3/08* | (2023.01) | |
| *G06N 5/04* | (2023.01) | |
| *G06N 3/045* | (2023.01) | |
| *G06N 3/047* | (2023.01) | |
| *G06N 3/084* | (2023.01) | |

(Continued)

(52) U.S. Cl.
CPC ......... *G06N 3/084* (2013.01); *G06F 18/2155* (2023.01); *G06F 18/24155* (2023.01); . *G06N 3/045* (2023.01); *G06N 3/047* (2023.01); *G06N 3/08* (2013.01); *G06N 5/04* (2013.01)

(58) Field of Classification Search
CPC ........ G06N 3/084; G06N 3/045; G06N 3/047; G06N 3/08; G06N 5/04; G06N 3/082; G06F 18/2155; G06F 18/24155; G06F 18/24133
See application file for complete search history.

(56) References Cited

U.S. PATENT DOCUMENTS

| | | | | |
|---|---|---|---|---|
| 2016/0378863 | A1* | 12/2016 | Shlens | ...... G06N 3/08 707/769 |
| 2017/0132512 | A1* | 5/2017 | Ioffe | ...... G06V 10/774 |
| 2020/0051309 | A1* | 2/2020 | Labbe | ...... G06T 1/60 |

FOREIGN PATENT DOCUMENTS

DE   102019209457 A1 * 12/2020 ........... G06K 9/6278

OTHER PUBLICATIONS

Translated copy of DE102019209457A1 from Google Patent. https://patents.google.com/patent/DE102019209457A1/en?oq=DE+102019209457+A1 (Year: 2020).*

(Continued)

*Primary Examiner* — Kamran Afshar
*Assistant Examiner* — Lokesha G Patel
(74) *Attorney, Agent, or Firm* — Jeffrey D. Frantz

(57) ABSTRACT

A neural network system includes a first neural network configured to predict a mean value output and epistemic uncertainty of the output given input data, and a second neural network configured to predict total uncertainty of the output of the first neural network. The second neural network is trained to predict total uncertainty of the output of the first neural network given the input data through a training process involving minimizing a cost function that involves differences between a predicted mean value of a geophysical property of a geological formation from the first neural network and a ground-truth value of the geophysical property of the geological formation. The neural network system further includes one or more processors configured (Continued)

to run a software module that determines aleatoric uncertainty of the output of the first neural network based on the epistemic uncertainty of the output and the total uncertainty of the output.

24 Claims, 11 Drawing Sheets

(51) Int. Cl.
*G06F 18/214* (2023.01)
*G06F 18/2415* (2023.01)

(56) References Cited

OTHER PUBLICATIONS

Gurevich, P., & Stuke, H. (2017). Pairing an arbitrary regressor with an artificial neural network estimating aleatoric uncertainty. arXiv preprint arXiv:1707.07287. (Year: 2017).*

Swiler, L., Paez, T., Mayes, R., & Eldred, M. (2009). Epistemic uncertainty in the calculation of margins. In 50th AIAA/ASME/ASCE/AHS/ASC Structures, Structural Dynamics, and Materials Conference 17th AIAA/ASME/AHS Adaptive Structures Conference 11th AIAA No. (p. 2249). (Year: 2009).*

Kendall, A., & Gal, Y. (2017). What uncertainties do we need in bayesian deep learning for computer vision?. Advances in neural information processing systems, 30. (Year: 2017). Provided by Applicant in accordance with IDS dated Jul. 1, 2021.*

Adler, Jonas et al., "Deep Bayesian Inversion," arXiv preprint arXiv:1811.05910 (2018), 34 pages.

Kendall, A. et al., "What Uncertainties Do We Need in Bayesian Deep Learning for Computer Vision", Advances in neural information processing systems., 31st Conference on Neural Information Processing Systems (NIPS), Long Beach, California, USA, 2017, 11 pages.

Kuleshov, V. et al., "Accurate Uncertainties for Deep Learning Using Calibrated Regression," arXiv preprint arXiv:1807.00263, Proceedings of the 35th International Conference on Machine Learning, Stockholm, Sweeden, 2018, 9 pages.

* cited by examiner

DUAL NEURAL NETWORK ARCHITECTURE FOR DETERMINING EPISTEMIC AND ALEATORIC UNCERTAINTIES

CROSS-REFERENCE TO RELATED APPLICATION(S)

The present disclosure claims priority from U.S. Provisional Pat. No. 62/896,339, entitled "DUAL NEURAL NETWORK ARCHITECTURE FOR DETERMINING EPISTEMIC AND ALEATORIC UNCERTAINTIES," filed on Sep. 5, 2019, herein incorporated by reference in its entirety.

FIELD

The present disclosure relates to deep learning techniques.

BACKGROUND

Bayesian Neural Networks have been traditionally used for uncertainty estimation in supervised learning settings, for both regression and classification problems. This method works by determining the posterior weight distributions of deep neural networks, and therefore providing both a mean and a variance of the estimated outputs. As these weight distributions provide the epistemic (model) uncertainty, Bayesian Neural Networks can be used to differentiate in and out of distribution (OOD) predictions. See Kendall et al., "What uncertainties do we need in Bayesian deep learning for computer vision?", Advances in neural information processing systems, 2017, hereinafter Kendall.

Aleatoric uncertainty on the other hand is the randomness arising from noise inherent to the observations and can be heteroscedastic in nature. Recently a few different methods have been introduced to assign heteroscedastic data dependent standard deviations to outputs of deep neural networks. Kendall achieve this via a modified cost function for the case of Gaussian noise as:

$$L(x, y, \theta) = \frac{1}{N} \sum_{i=1}^{N} \frac{1}{\sigma_i^2} \|f_\theta(x_i) - y_i\|^2 + \log \sigma_i^2 \qquad \text{Eqn. (1)}$$

This model enables the tuning of the standard deviation ($\sigma_i$), with respect to the mean square error while the second term prevents the assignment of very high uncertainty values for all data points.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Neural network systems and related machine learning methods are provided that use a dual neural network architecture to determined epistemic and aleatoric uncertainties associated with predicted output data.

In embodiments, a neural network system is provided that includes a first neural network and a second neural network. The first neural network can be configured to predict a mean value output and epistemic uncertainty of the output given input data. The second neural network can be configured to predict total uncertainty of the output of the first neural network. A module can be configured to determine aleatoric uncertainty of the output of the first neural network based on the epistemic uncertainty of the output and the total uncertainty of the output.

In embodiments, the first neural network of the system can be a Bayesian neural network or an artificial neural network with dropout.

In embodiments, the second neural network of the system can be an artificial neural network or an additional Bayesian neural network.

In embodiments, the aleatoric uncertainty of the output can be sensitive to heteroscedastic noise in the input data.

In embodiments, the second neural network of the system can be trained to predict total uncertainty of the output of the first neural network given the input data.

In embodiments, the error of the first neural network can be used to train the second neural network to learn a mapping between the input data and total uncertainty of the output of the first neural network.

In embodiments, the same input data can be applied to both the first neural network and the second neural network simultaneously or in a parallel manner.

In embodiments, the second neural network of the system can be trained by minimizing a cost function that involves differences between a predicted mean value output of the first neural network and a ground-truth value of the output.

In embodiments, the first neural network of the system can be trained by minimizing a cost function that involves a ground-truth value of the output.

In embodiments, the first neural network of the system can be trained to predict a mean value and epistemic uncertainty of an unknown geophysical property of a geological formation given a vector of measurement data of the geological formation as input. The second neural network can be trained to predict total uncertainty of the unknown geophysical property of the geological formation given the same vector of measurement data of the geological formation as input. The module can be configured to determine aleatoric uncertainty of the unknown geophysical property of the geological formation based on the epistemic uncertainty of the unknown geophysical property of the geological formation and the total uncertainty of the unknown geophysical property of the geological formation.

In embodiments, at least one of the first neural network, the second neural network and the module of the system can be realized by a processor.

In another aspect, a machine learning method is provided that involves a training phase and an inference phase. In the training phase, a first neural network is trained to predict a mean value output and epistemic uncertainty of the output given input data, and a second neural network is trained to predict total uncertainty of the output of the first neural network. In the inference phase, input data is supplied to the trained first neural network to predict a mean value output as well as the epistemic uncertainty of the output given said input data, the trained second neural network is used to predict total uncertainty of the output of the trained first neural network, and aleatoric uncertainty of the output of the first neural network is determined based on the epistemic uncertainty of the output and the total uncertainty of the output.

In embodiments, the first neural network of the method can be a Bayesian neural network or an artificial neural network with dropout.

In embodiments, the second neural network of the method can be an artificial neural network or an additional Bayesian neural network.

In embodiments, the aleatoric uncertainty of the output can be sensitive to heteroscedastic noise in the input data.

In embodiments, the training phase of the method can further comprise training the second neural network to predict total uncertainty of the output of the first neural network given the input data.

In embodiments, the training phase of the method can further comprise using error of the first neural network to train the second neural network to learn a mapping between the input data and total uncertainty of the output of the first neural network.

In embodiments, the training phase of the method can further comprise training the second neural network by minimizing a cost function that involves differences between a predicted mean value of the output of the first neural network and a ground-truth value of the output.

In embodiments, the training phase of the method can further comprise training the first neural network by minimizing a cost function that involves a ground-truth value of the output.

In embodiments, in the training phase, the same input data can be applied to both the first neural network and the second neural network simultaneously or in a parallel manner.

In yet another aspect, a machine learning method for geological formation modeling is provided that involves a training phase and an inference phase. In the training phase, a first neural network is trained to predict a mean value and epistemic uncertainty of an unknown geophysical property of a geological formation given a vector of measurement data of the geological formation as input, and a second neural network is trained to predict total uncertainty of the unknown geophysical property of the geological formation given the same vector of measurement data of the geological formation as input. In the inference phase, at least one vector of measurement data of a geological formation is input to the trained Bayesian neural network to predict a mean value and epistemic uncertainty of the unknown geophysical property of the geological formation, the trained second neural network is used to predict total uncertainty of the unknown geophysical property of the geological formation, and aleatoric uncertainty of the unknown geophysical property of the geological formation is determined based on the epistemic uncertainty and the total uncertainty of the unknown geophysical property of the geological formation.

In embodiments, the first neural network of the method for geological formation modeling can be a Bayesian neural network or an artificial neural network with dropout.

In embodiments, the second neural network of the method for geological formation modeling can be an artificial neural network or an additional Bayesian neural network.

In embodiments, the aleatoric uncertainty of the unknown geophysical property of the geological formation can be sensitive to heteroscedastic noise in the measurement data of the geological formation.

In embodiments, the training phase of the method can further comprise training the first neural network by minimizing a cost function that involves a ground-truth value of the geophysical property of the geological formation.

In embodiments, the training phase of the method can further comprise training the second neural network by minimizing a cost function that involves differences between a predicted mean value of the unknown geophysical property of the geological formation from the first neural network and a ground-truth value of the geophysical property of the geological formation.

In embodiments, at least one of the first neural network and the second neural network of the method for geological formation modeling can be realized by a processor.

In embodiments, the training phase of the method can involve applying the vector of measurement data of the geological formation to both the first neural network and the second neural network simultaneously or in a parallel manner.

In embodiments, the method for geological formation modeling can further comprise performing the operations of the inference phase over a plurality of vectors of measurement data of the geological formation at varying depths to predict the geophysical property of the geological formation and associated epistemic uncertainty and aleatoric uncertainty at the varying depths.

Further features and advantages of the subject disclosure will become more readily apparent from the following detailed description when taken in conjunction with the accompanying drawings.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings.

DETAILED DESCRIPTION

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show structural details in more detail than is necessary, the description taken with the drawings making apparent to those skilled in the art how the several forms of the subject disclosure may be embodied in practice. Furthermore, like reference numbers and designations in the various drawings indicate like elements.

Figure 1:
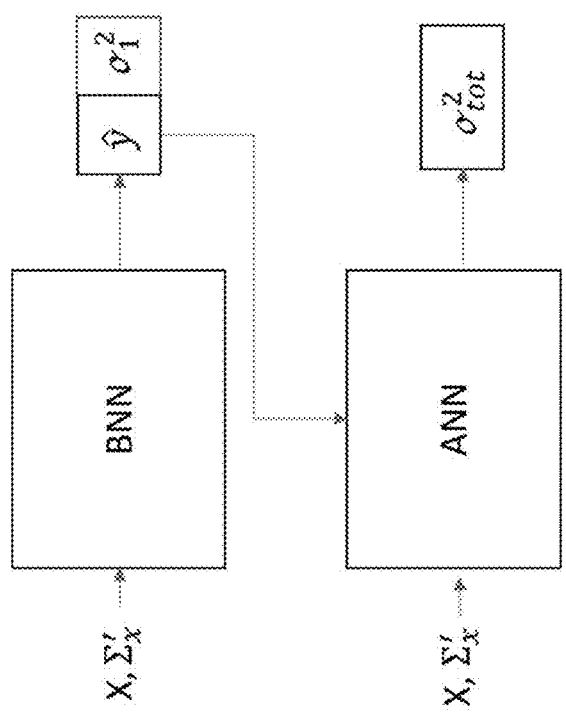
FIG. 1 is a schematic diagram of a neural network system including a Bayesian Neural Network (BNN) and Artificial Neural Network (ANN). The BNN is configured to predict or estimate a mean output and associated standard deviation (epistemic uncertainty) given a vector of feature data input to the BNN. The error of the BNN is used to train a second network (ANN) which is configured to estimate total uncertainty ($\sigma_{tot}$) of the output of the BNN given the same vector of feature data as input. The difference between this total uncertainty ($\sigma_{tot}$) and the epistemic uncertainty ($\sigma_1$) as output by the BNN reflects aleatoric uncertainty ($\sigma_2$) of the output data of the BNN.

Deep learning techniques have been shown to be extremely effective for various classification and regression problems, but quantifying the uncertainty of their predictions and, separating them into the epistemic and aleatoric fractions is still considered challenging. Understanding the source of the uncertainty and reducing the uncertainty is key to designing intelligent applications, such as automated log interpretation answer products for oil and gas exploration and field development. A challenge of importance in such petrophysical applications is the ability to identify out of distribution testing data (that is data which has not been seen while training the model), or the ability to be sensitive to heteroscedastic aleatoric noise in the feature space arising from tool and geological conditions. In the present disclosure, a system that employs a combination of a Bayesian Neural Network (BNN) and an Artificial Neural Network (ANN) is provided that addresses this challenge. A schematic representation of the system is shown in FIG. 1.

Figure 9:
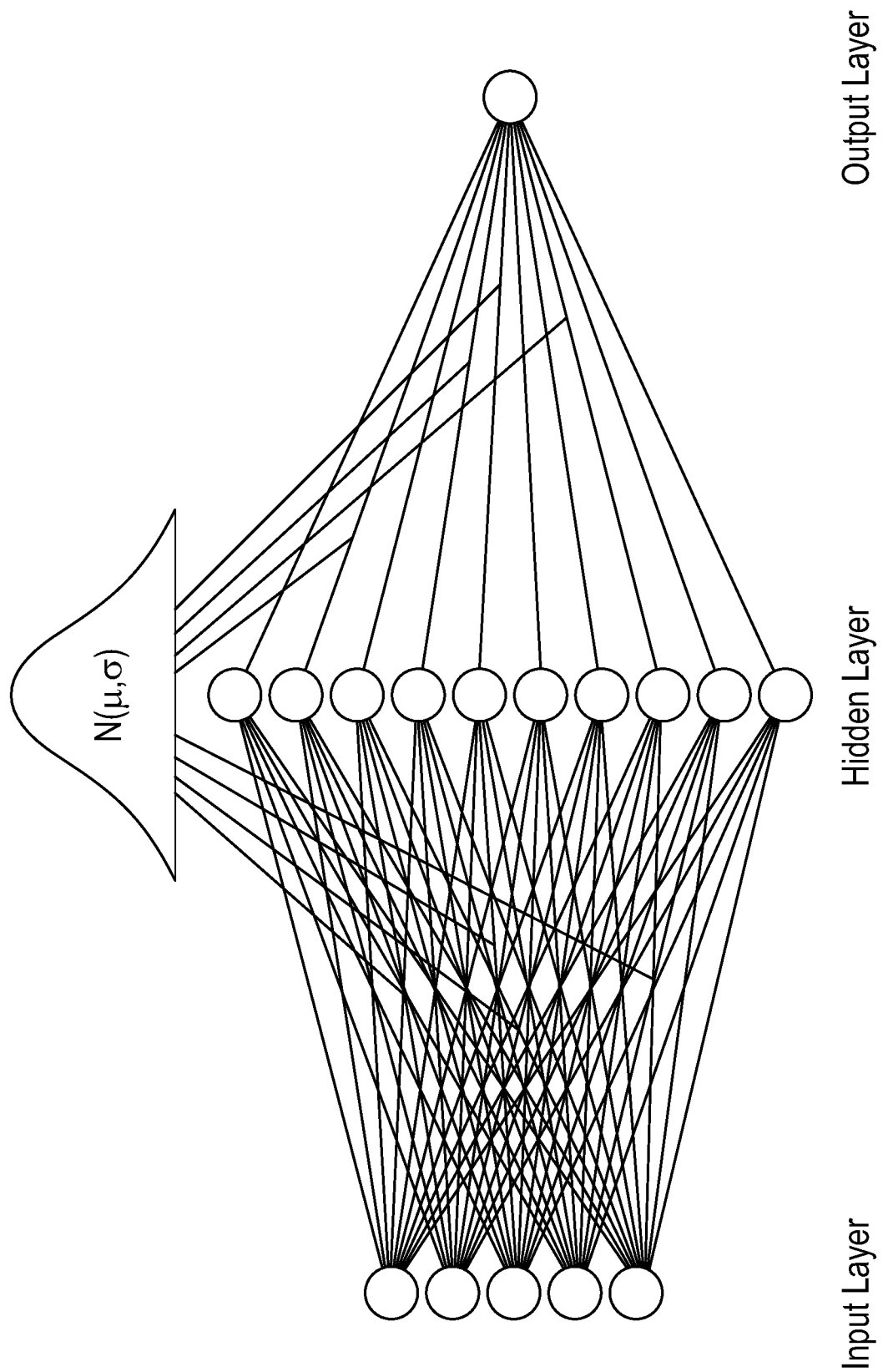
FIG. 9 is a schematic diagram of an exemplary neural network.

Both the BNN and the ANN are separate and distinct neural networks. A neural network is a computational model that includes a collection of layers of nodes interconnected by edges with weights and activation functions associated with the nodes. Inputs are applied to one or more input nodes of the neural network and propagate through the neural network in a manner influenced by the weights and activation functions of the nodes, e.g., the output of a node is related to the application of the activation function to the weighted sum of its inputs). As a result, one or more outputs are obtained at corresponding output node(s) of the neural network. As shown in FIG. 9, the layer(s) of nodes between the input nodes and the output node(s) are referred to as hidden layers, and each successive layer takes the output of the previous layer as input. Parameters of the neural network, including the weights associated with the nodes of the neural network, are learnt during a training phase. The BNN differs from the ANN in that the weights associated with the nodes of the BNN are assigned a probability distribution instead of a single value or point estimate. These probability distributions describe the variance in weights and can be used to estimate uncertainty in predictions. Training a Bayesian neural network via variational inference learns the parameters of these weight distributions instead of the weights directly.

The BNN is a neural network that is trained to perform Bayesian inference by determining the posterior distribution of the weights of the BNN given training data, p(w|D). This distribution of weights enables it to answer predictive queries about unseen data. More specifically, the predictive distribution of an unknown label or output $\hat{y}$, which can be defined by a mean value output and standard deviation, for a test data sample $\hat{x}$ is given by $P(\hat{y}|\hat{x}) = \mathbb{E}_{p(w|D)}[P(\hat{y}|\hat{x}),w]$. The different configuration of the weights of the BNN, which are weighted according to the posterior distribution, makes a prediction about the unknown output $\hat{y}$ given the test data item $\hat{x}$. Thus taking an expectation of the posterior distribution on weights is equivalent to using an ensemble of an infinite number of neural networks. As this problem is intractable, this is typically solved using variational approximation to the Bayesian posterior weight distribution or using dropout during the inference which has also been shown to approximate Bayesian inference.

The Bayesian Neural Network (BNN) is trained to estimate the mean value and standard deviation of the predictive distribution of the output $\hat{y}$ given the test data sample $\hat{x}$ as input using variational inference. The probability distribution of weights of the BNN are assumed to be Gaussian. The standard deviation of the predictive distribution of the output $\hat{y}$ represents epistemic uncertainty $\sigma_1$ in the predictive distribution of the output $\hat{y}$. In the other words, the BNN is trained to map the test data sample $\hat{x}$ to the output $\hat{y}$ with some error. The mean of the output $\hat{y}$ is used to train the ANN to estimate the total standard deviation or total uncertainty $\sigma_{tot}$ in the output $\hat{y}$ given the same test data sample $\hat{x}$ as input. In the other words, the ANN is trained to map the test data sample $\hat{x}$ to the total standard deviation or total uncertainty $\sigma_{tot}$ in the output $\hat{y}$ of the BNN.

In embodiments, the ANN can be trained to estimate the total standard deviation or total uncertainty $\sigma_{tot}$ using the *Direct Estimation method* as described in Adler et al., "Deep Bayesian inversion." arXiv preprint arXiv:1811.05910, 2018. In the *Direct Estimation method*, the total uncertainty can be based on the Law of total variance and can be trained to be well correlated to the mean square error of the output of the BNN as shown in Eq. (2). For example, the ANN can be trained by adjusting the weights of the ANN to minimize the cost function of Eqn. (2) below:

$$\min_{\vartheta} \sum_{i=1}^{N} \left[ (h_\vartheta(x_i, y_{true})) - (\hat{y}_i - y_{true})^2 \right]^2, \quad \text{Eqn. (2)}$$

where the term $h_\Theta(x_i, y_{true})$ represents the predicted total uncertainty from the second neural network;

where the second term $\hat{y}_i - y_{true}$ represents the difference between the output of the BNN and the corresponding ground-truth provided as part of the training data; and where the cost function minimizes the difference between the first term and the second term over all the training data.

In embodiments, the BNN and the ANN can be trained and optimized together or in series.

In the inference phase, the same input data can be applied to both the BNN and the ANN simultaneously or in a parallel manner. The BNN estimates the mean value and the epistemic uncertainty $\sigma_1$ of the unknown output $\hat{y}$, and the ANN outputs the total uncertainty $\sigma_{tot}$ of the unknown output $\hat{y}$. The aleatoric uncertainty $\sigma_2$ of the unknown output $\hat{y}$ can be determined from the combination of the epistemic uncertainty $\sigma_1$ and the total uncertainty $\sigma_{tot}$, for example, according to the relation of Eqns. (3a) and (3b).

$$\sigma_{tot}^2 = \sigma_1^2 + \sigma_2^2 \quad \text{Eqn. (3a)}$$

$$\sigma_2 = \sqrt{\sigma_{tot}^2 - \sigma_1^2} \quad \text{Eqn. (3b)}$$

The total uncertainty $\sigma_{tot}$ can be calibrated to get better results for the training datasets. See Kuleshov et al., "Accurate uncertainties for deep learning using calibrated regression", arXiv preprint arXiv:1807.00263 (2018), hereinafter Kuleshov. One of the key benefits of this approach is a better understanding of the components of the uncertainty, as the epistemic uncertainty $\sigma_1$ is a good metric to differentiate in and out of distribution (OOD) datasets (especially valuable for testing models in different geological formations), while the aleatoric uncertainty $\sigma_2$ is sensitive to the heteroscedastic noise within the training feature space. Understanding the aleatoric uncertainty $\sigma_2$ originating from the heteroscedastic noise in the feature space can also help with experimental design and to optimize sampling schemes. This workflow therefore is a more complete method for uncertainty quantification and separation in deep learning models.

Figure 2:
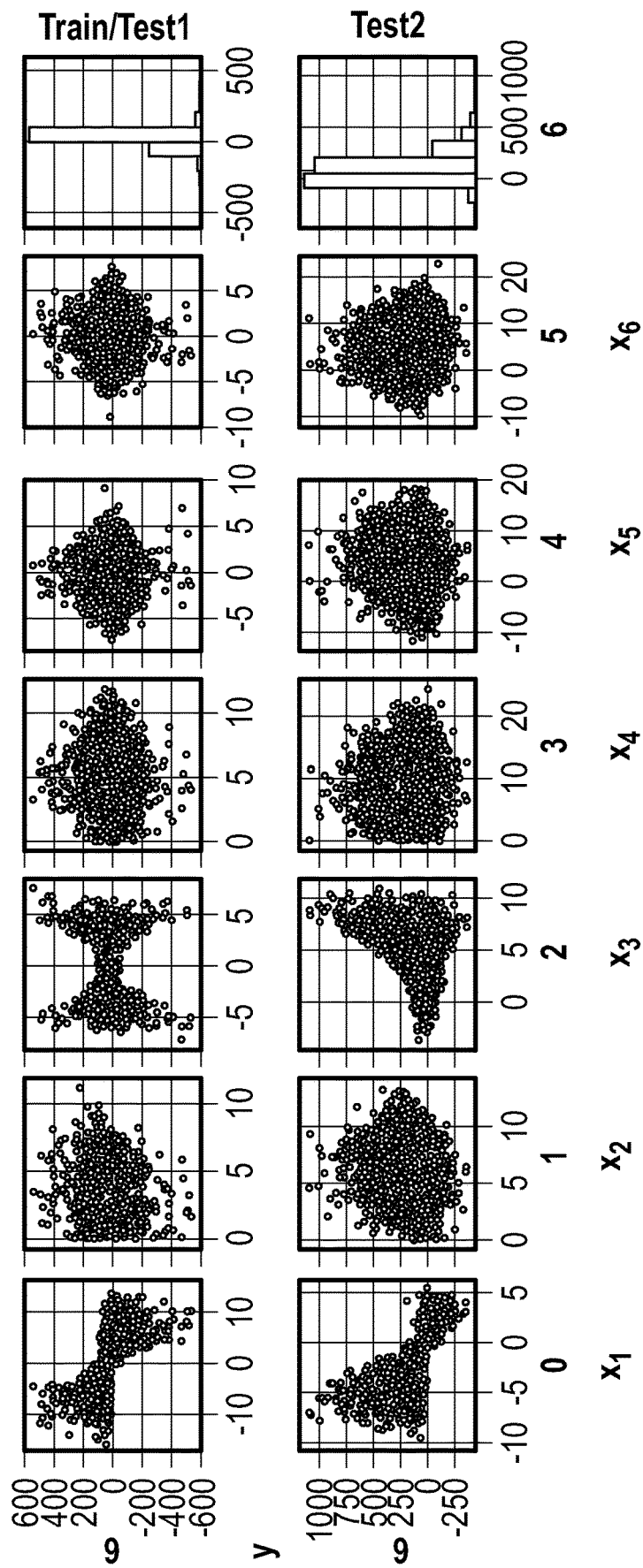
FIG. 2 depicts a pair plot of the in-distribution (ID) feature data used for training and testing the neural network system of FIG. 1 along with out-of-distribution (OOD) feature data used for testing the neural network system of FIG. 1.

The application of this system to a synthetic dataset is described below. A training dataset of 1000 points was created with input values $x_i$ (i=1 to 6), sampled from Gaussians with mean values of 0, 3, 0, 5, 0, 0 and standard deviations of 4, 2, 2, 2, 2, 2, respectively. Test datasets 1 and 2 were created with in-distribution (ID) data which has input features following the same distribution as the training data, and out of distribution (OOD) data with features having only a mild overlap with the training set, respectively. The training dataset was made to satisfy the following relation, $$y_i = \sin(x_1) + x_2^2 - 2x_1x_3^2 + \sqrt{x_4} + e^{-x_2 x_5^2} - 3x_6/[0.2 + \text{abs}(x_1)] + \epsilon \quad (4)$$

with $\epsilon \sim N(0, \sigma_{noise})$ and $\sigma_{noise} \sim U[0,2]$, where U refers to a uniform distribution. FIG. 2 shows a pair plot of the input features of the train and test datasets.

A neural network system including a BNN and ANN as shown in FIG. 1 was trained on this dataset, and tested using ID data and OOD data. Both the BNN and the ANN were configured with a similar architecture of 3 hidden layers with 20 neurons each. Tan h activation function was used for the hidden layers of the BNN and relu(x)=max(0,x) activation function was used for the hidden layers of the ANN.

Figure 3A:
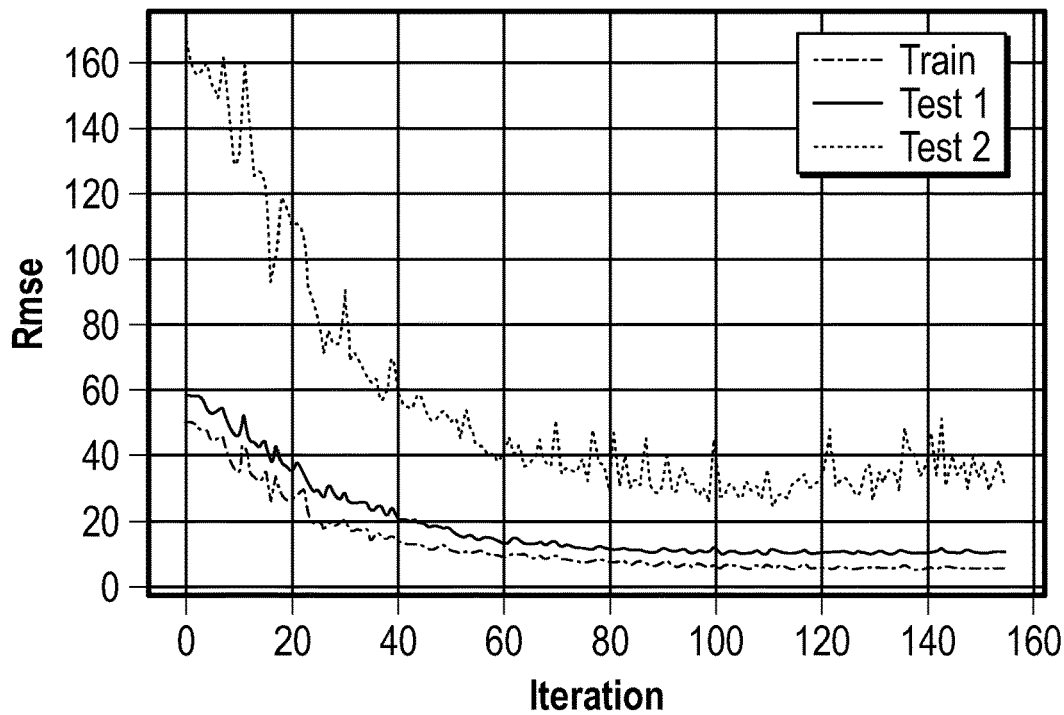
FIG. 3A depicts a plot which shows the root mean square error (RMSE) of the BNN of FIG. 1 as a function of iteration number for the training and testing of the BNN of FIG. 1 using the ID feature data as well as the testing of the BNN of FIG. 1 using the OOD feature data1; this plots reflects the higher accuracy of the training and testing using the ID feature data in comparison to the testing using OOD feature data.
Figure 3B:
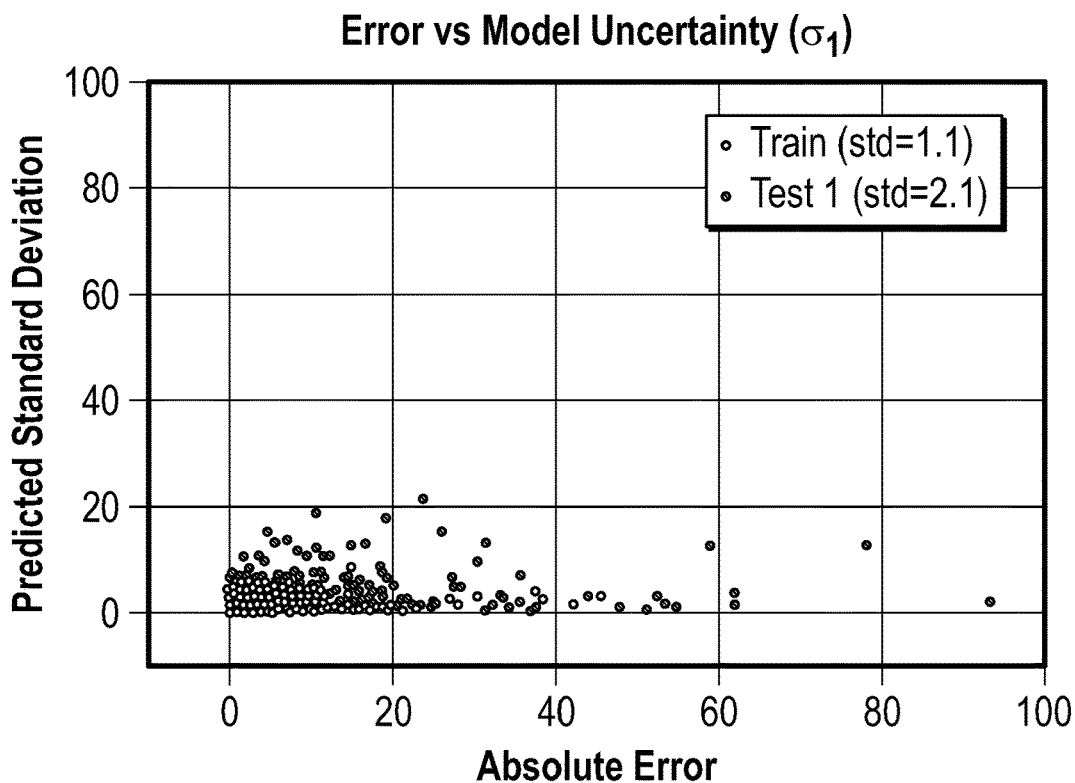
FIG. 3B depicts a plot that shows the correlation of the epistemic uncertainty with the absolute error for the training and testing of the BNN of FIG. 1 using the ID feature data.
Figure 3C:
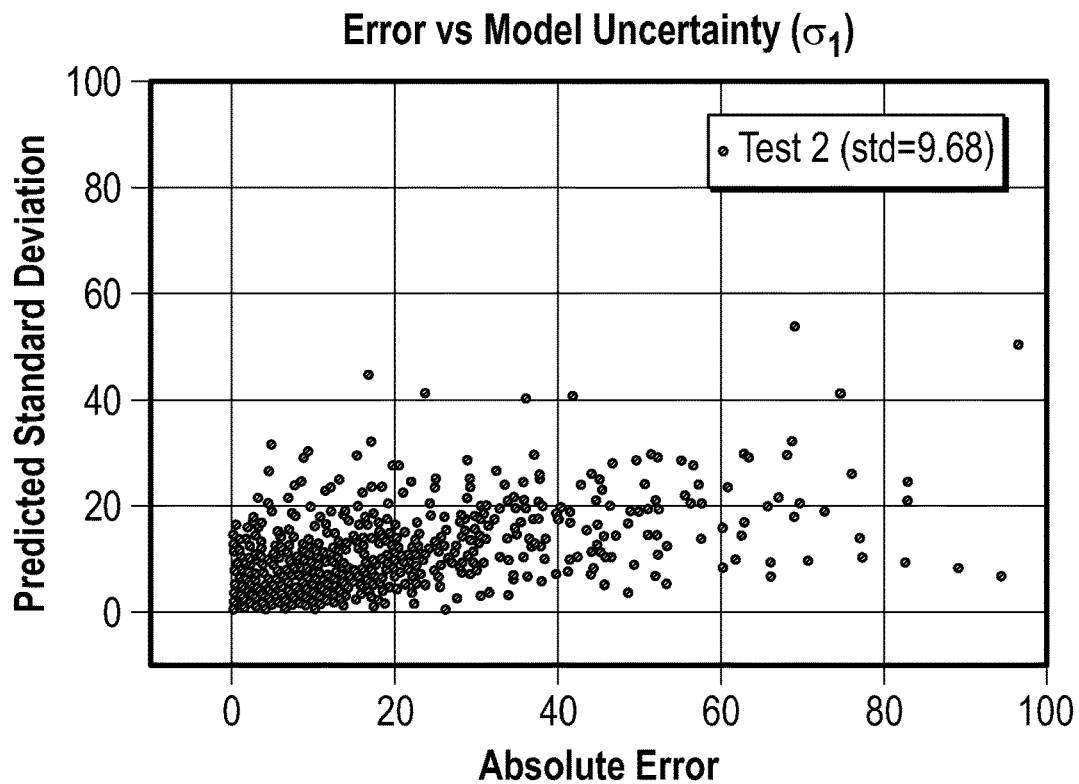
FIG. 3C depicts a plot that shows the correlation of the epistemic uncertainty with the absolute error for the testing of the BNN of FIG. 1 using the OOD feature data.

The output of the BNN during training and testing is shown in FIGS. 3A, 3B and 3C. The plot of FIG. 3A is the learning curve showing the root-mean-square-error (RMSE) as a function of iterations, reflecting the accuracy of the BNN network. The plots of FIGS. 3B and 3C show the correlation of the epistemic uncertainty $\sigma_1$ with the absolute error for the training and testing using the ID and OOD datasets.

It can be inferred from FIGS. 3A, 3B and 3C that the epistemic uncertainties $\sigma_1$ determined by the BNN are higher for the out-of-distribution data sets in comparison to the in-distribution datasets. Additionally, the epistemic uncertainties $\sigma_1$ determined by the BNN are not well correlated with absolute error.

Figure 4A:
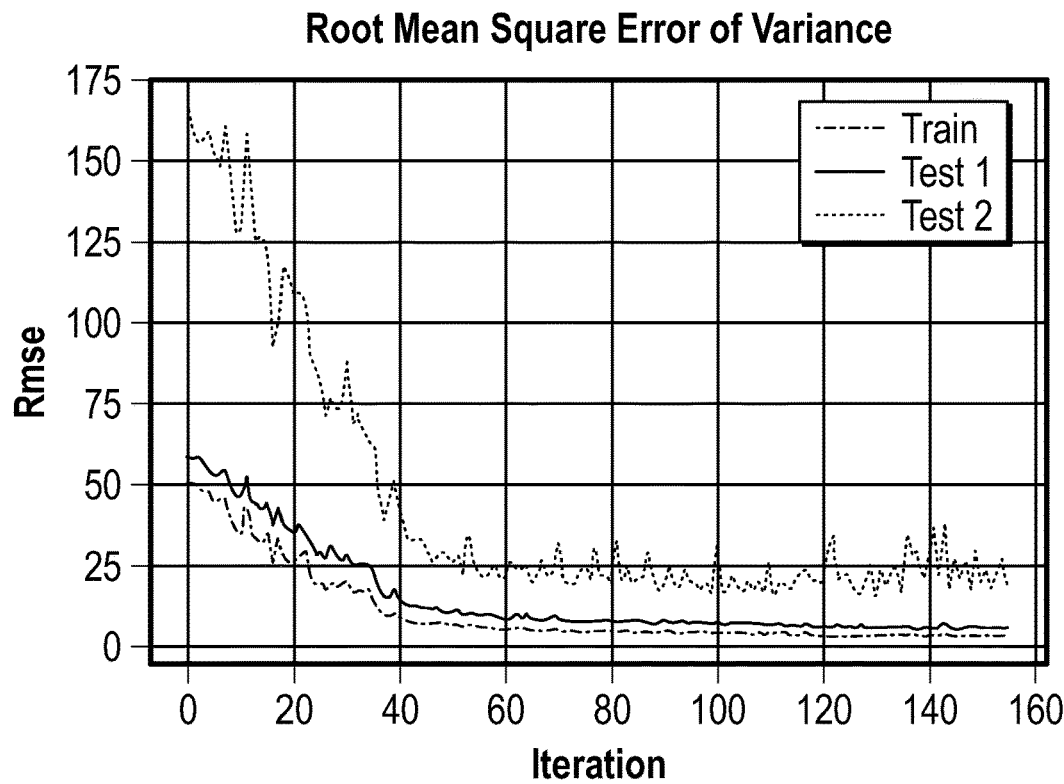
FIG. 4A depicts a plot which shows the RMSE for the total uncertainty predicted by the ANN as a function of iteration number for the training and testing of the ANN of FIG. 1 using the ID feature data as well as the testing of the ANN of FIG. 1 using the OOD feature data; this plot reflects the higher accuracy of the training and testing of the ANN of FIG. 1 using the ID feature data in comparison to the testing of the ANN of FIG. 1 using the OOD feature data.
Figure 4B:
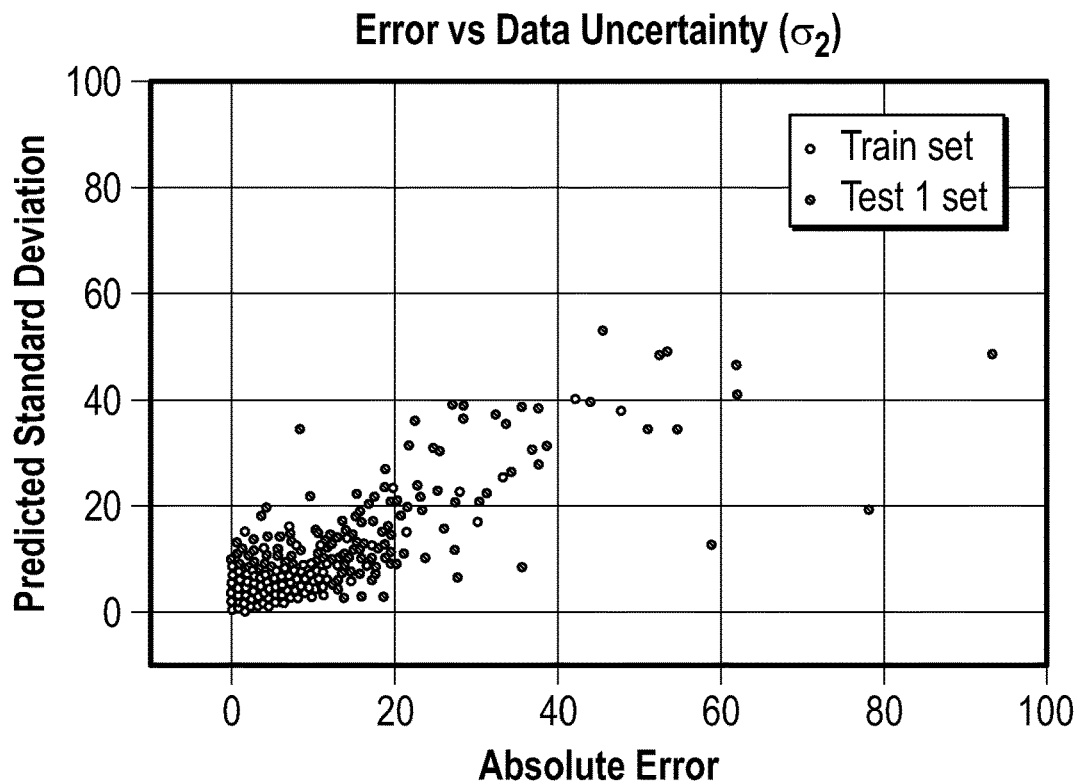
FIG. 4B depicts a plot that shows the correlation of the aleatoric uncertainties ($\sigma_2$) with the absolute error for the training and testing of the ANN of FIG. 1 using the ID feature data.
Figure 4C:
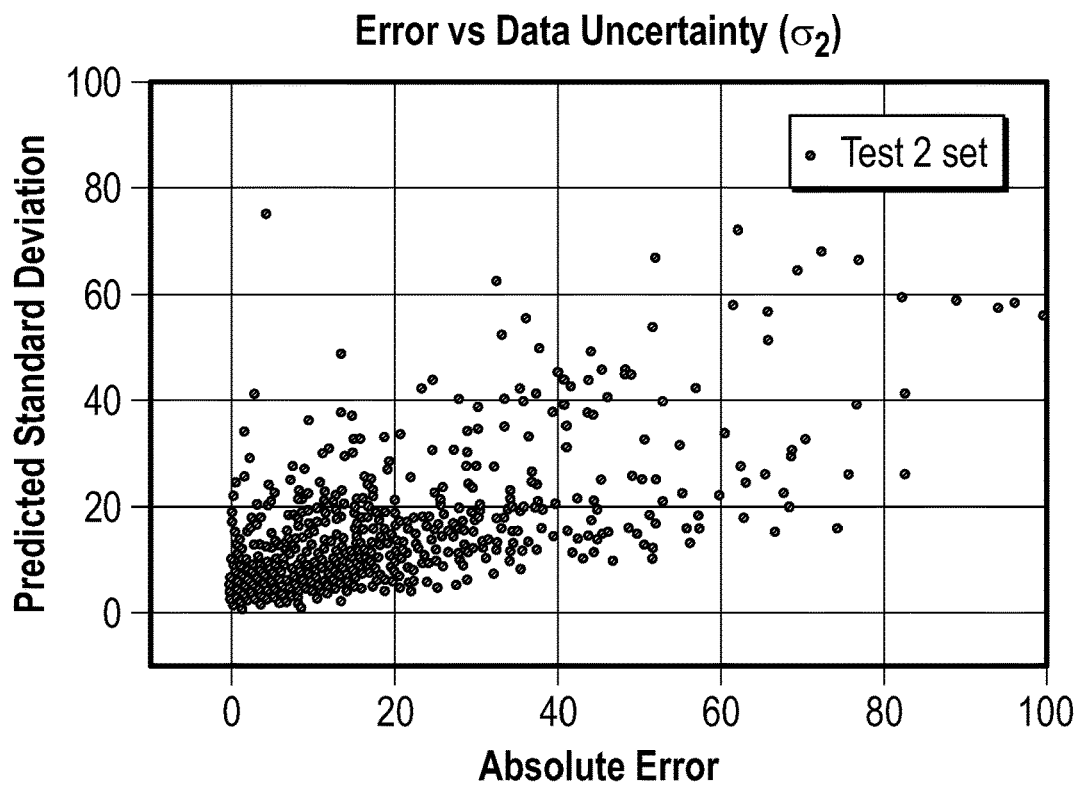
FIG. 4C depicts a plot that shows the correlation of the aleatoric uncertainties ($\sigma_2$) with the absolute error for the testing of the ANN of FIG. 1 using the OOD feature data.

The output of the ANN during training and testing is shown in FIGS. 4A, 4B and 4C. The plot of FIG. 4A shows the root mean square error of the prediction of total standard deviation or total uncertainty $\sigma_{tot}$ for the training and testing using the ID and OOD datasets. The plots of FIGS. 4B and 4C show the estimated aleatoric uncertainties $\sigma_2$ determined from the epistemic uncertainty $\sigma_1$ and the total uncertainty $\sigma_{tot}$ according to the relation of Eqns. (3a) and (3b) versus the absolute error for the training, ID and OOD datasets. It can be seen from FIGS. 4B and 4C that the aleatoric uncertainty $\sigma_2$ is well correlated to the absolute error.

In other embodiments, the BNN of the system can be replaced by ANN network with dropout to obtain the mean output and epistemic uncertainty. Additionally or alternatively, the ANN of the system can be configured as an additional BNN or a dropout-ANN network to obtain the total uncertainty.

Figure 5A:
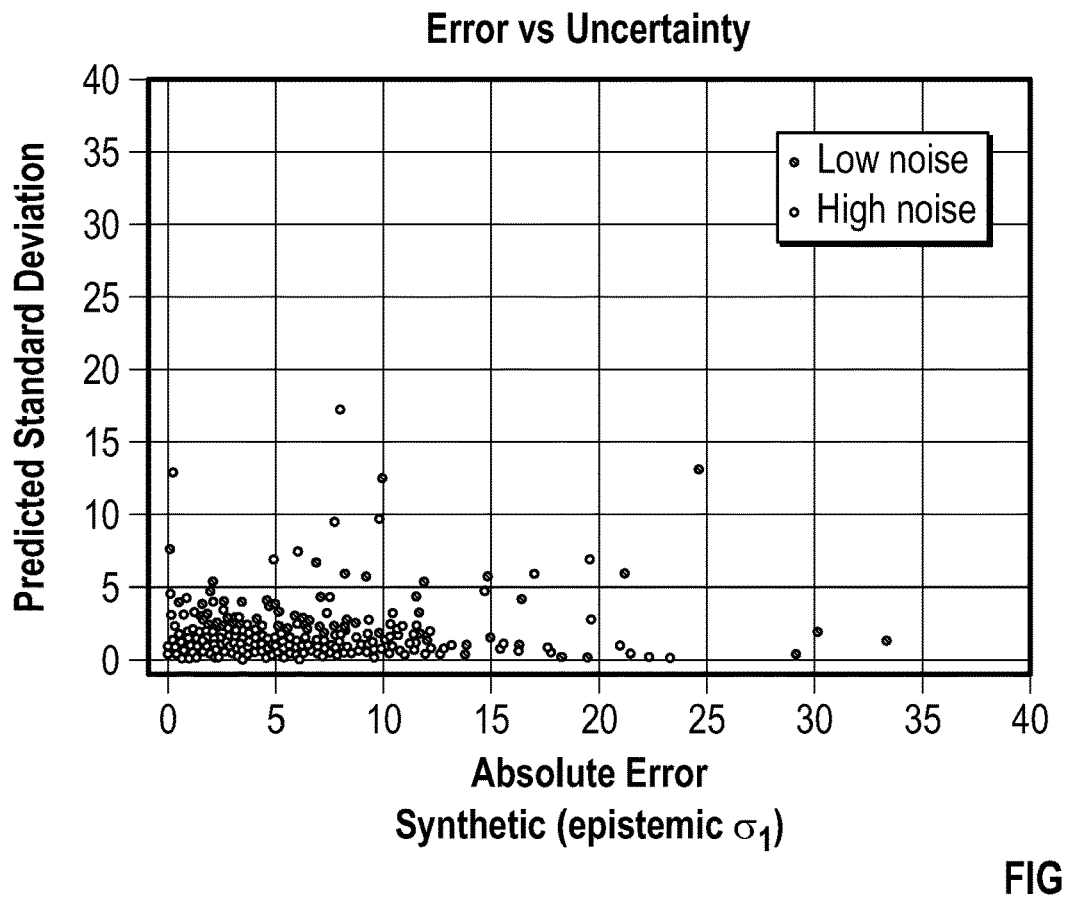
FIG. 5A is a plot of the epistemic uncertainty $\sigma_1$ predicted by the dual network system of FIG. 1 for training datasets that include the addition of synesthetic low noise and high noise.
Figure 5B:
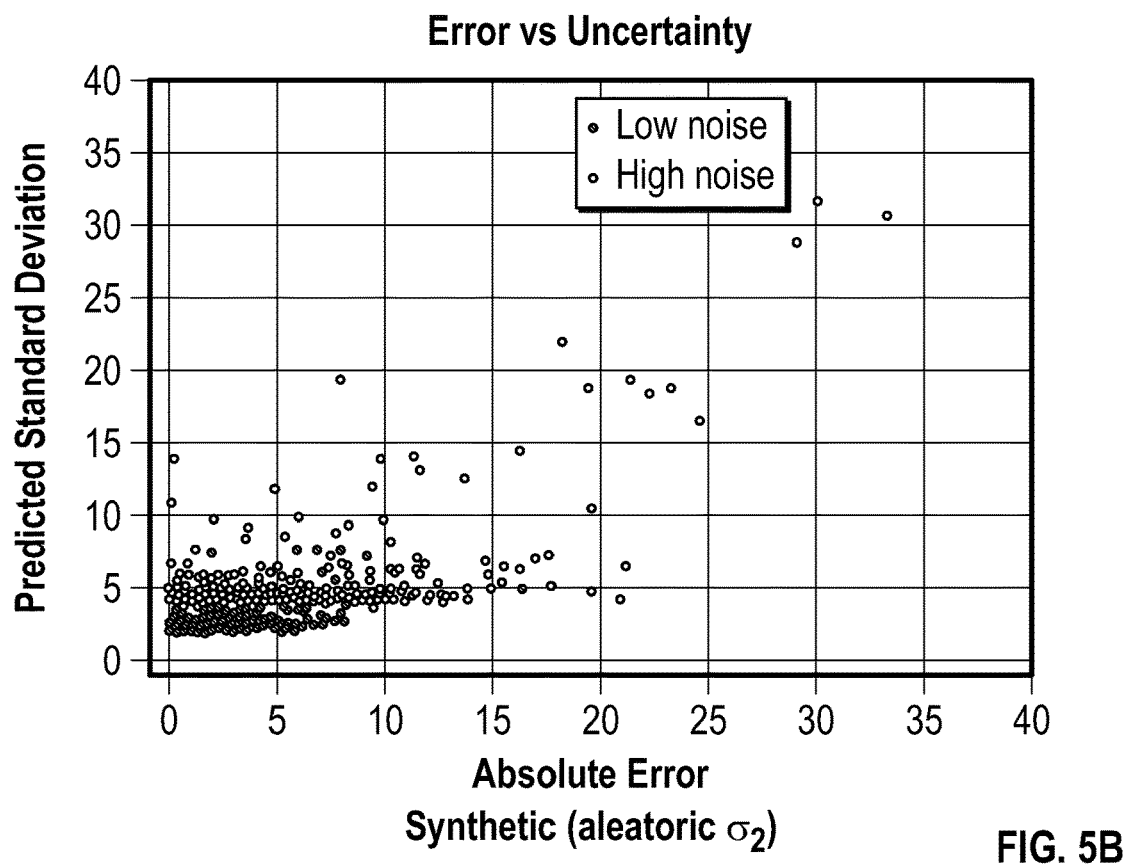
FIG. 5B is a plot of the aleatoric uncertainty $\sigma_2$ predicted by the dual network system of FIG. 1 for training datasets that include the addition of synesthetic low noise and high noise.

A demonstration of the impact of heteroscedastic noise on the datasets of FIG. 2 is shown in FIGS. 5A and 5B. Specifically, heteroscedastic noise of $\sigma_i=1$ for $x_1<0$ else $\sigma_i=5$ (low and high noise conditions respectively) was added to the dataset. The epistemic uncertainty $\sigma_1$ predicted by the dual network system for the training datasets with low noise and high noise is plotted in FIG. 5A. The aleatoric uncertainty $\sigma_2$ predicted by the dual network system for the training datasets with low noise and high noise is plotted in FIG. 5B. While the epistemic uncertainty will not separate the low and high noise datasets, the aleatoric uncertainty separates the two datasets.

In non-limiting examples, practical applications of the embodiments disclosed include determination of answer products for formation evaluation, such as permeability or other formation parameters, along with the associated uncertainty.

For example, in oil and gas exploration projects, tools consisting of seismic, sonic, magnetic resonance, resistivity, dielectric and/or nuclear sensors are sent downhole through boreholes to probe the earth's rock and fluid properties. The measurements from these tools are used to build reservoir models that are subsequently used for estimation and optimization of hydrocarbon production. Machine learning algorithms are often used to estimate the rock and fluid properties from the measured downhole data. Quantifying uncertainties of these properties is crucial for rock and fluid evaluation and subsequent reservoir optimization and production decisions.

These machine learning algorithms are often trained on 'ground-truth' data that characterize rock properties or fluid properties at different depths in a formation. The "ground-truth" data is often measured by laboratory core analysis or well log measurements that are deemed of suitable accuracy.

During the inference phase which involves application of these trained algorithms to field data, it is critical that the machine learning algorithm flag data as 'out of distribution' from new geologies that the model was not trained upon. It is also highly important to be sensitive to heteroscedastic aleatoric noise in the feature space arising from the combination of tool and geological conditions. Understanding the source of the uncertainty and reducing them is key to designing intelligent tools and applications such as automated log interpretation answer products for exploration and field development. The contribution to uncertainty comes from two factors: aleatoric and epistemic. Aleatoric uncertainty can be heteroscedastic in nature due to properties of the geological formation and response of measurements to different environmental factors.

Figure 6:
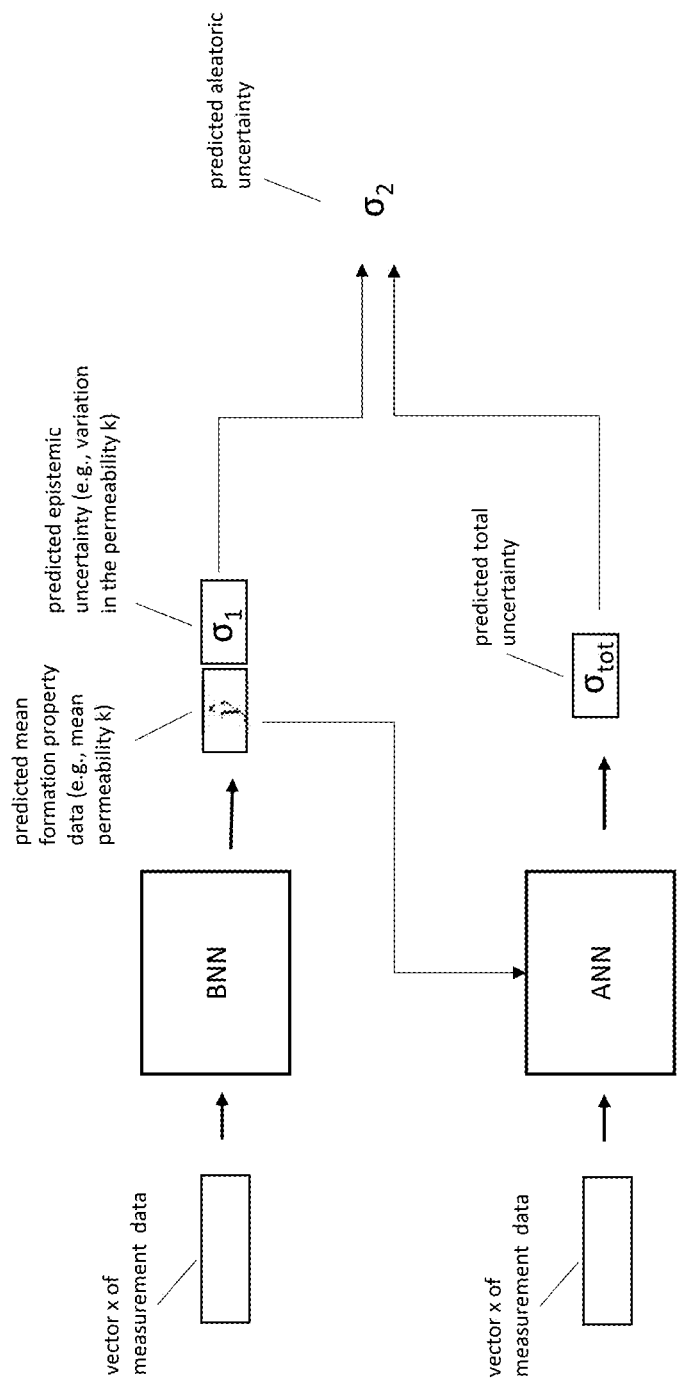
FIG. 6 is a schematic diagram of a neural network system including a Bayesian Neural Network (BNN) and Artificial Neural Network (ANN), which is configured to infer or predict mean formation property data along with epistemic uncertainty, aleatoric uncertainty and total uncertainty associated therewith given a vector of measurement data of a geological formation as input.

In embodiments, a neural network system including a BNN and ANN as shown in FIG. 6 can be trained to infer an unknown geophysical petrophysical or fluid property of a geological formation and its associated epistemic uncertainty, aleatoric uncertainty and total uncertainty given a vector $\hat{x}$ of measurement data as input. The vector $\hat{x}$ can include measurement data obtained directly or indirectly from measurements such as seismic, sonic, magnetic resonance, resistivity, dielectric and/or nuclear sensors that sent downhole through boreholes to probe a geological formation. The vector $\hat{x}$ can also possibly include measurement data obtained from laboratory analysis of core samples obtained from the geological formation or other useful physical measurement data of the geological formation. The geophysical property inferred by the neural network system can include a rock property or fluid property of the geological formation. For example, the geophysical property can be permeability, porosity, bound fluid volume, free fluid volume, mineralogy, etc. of the formation. In other examples, the geophysical property can be fluid quantities, viscosity, composition, rock geometry, fluid types, flow properties, or other suitable geophysical property of the formation. The neural network system includes a BNN and ANN similar to the embodiment described above with respect to FIG. 1. The BNN is trained to estimate the mean value ($\hat{y}$) and standard deviation ($\sigma_1$) of an unknown geophysical property given the vector $\hat{x}$ of measurement data as input using variational inference. The standard deviation of the unknown geophysical property as output by the BNN represents epistemic uncertainty $\sigma_1$ in the unknown geophysical property. The error in the prediction of the mean value ($\hat{y}$) of the unknown geophysical property as output from the BNN is used to train the ANN to estimate the total standard deviation or total uncertainty $\sigma_{tot}$ in the unknown geophysical property given the vector $\hat{x}$ of measurement data as input. Specifically, the ANN can be trained based on the error of the BNN (i.e., based on the differences between the ground-truth of the formation property and the mean formation property data ($\hat{y}$) output by the BNN) and is therefore sensitive to the heteroskedastic aleatoric uncertainty. In this manner, the neural network system of FIG. 6 can provide sensitivity to the different possible uncertainties in the computational model.

There are several different regression problems that the model is readily applicable for in the geophysical context. As an example, one application could be the determination of the formation permeability together with its epistemic uncertainty, aleatoric uncertainty and total uncertainty predicted from magnetic resonance measurements (relaxation distributions) and elemental information from inelastic capture spectroscopy measurements.

Figure 7:
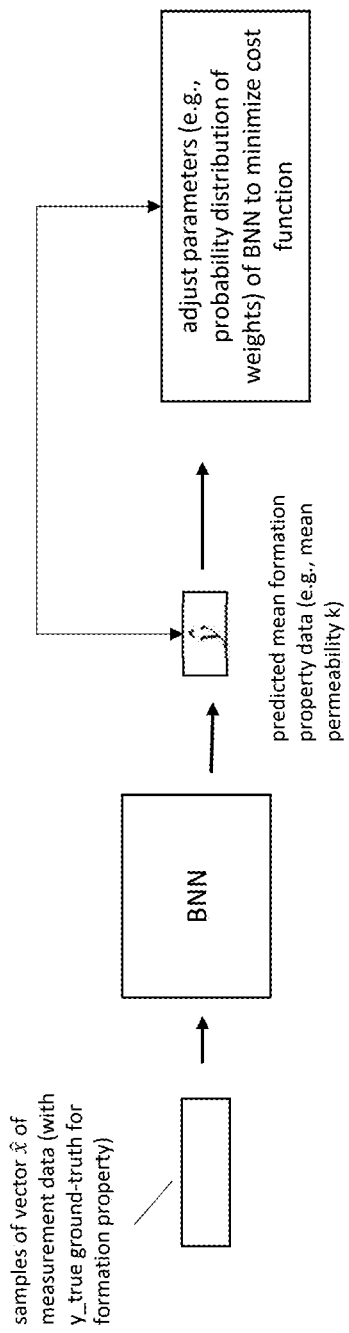
FIG. 7 is a diagram illustrating an example training iteration of the BNN of FIG. 6.

FIG. 7 illustrates a training iteration of the BNN where one or more samples of vector 2 of measurement data (along with ground-truth data for the relevant formation property) are supplied as training data (input) to the BNN. The predicted mean formation property data generated by the BNN and the ground-truth for the formation property data are used to compute a cost function. The parameters (e.g., probability distribution of weights) of the BNN are adjusted to minimize this cost function. This process can be repeated until the minimization of the cost function converges. This training iteration, including the posterior sampling and parameter optimization operations of the BNN, can be repeated for a number of samples (or sample batches) of the vector $\hat{x}$ of measurement data and associated ground truth data. In embodiments, each training iteration of the BNN can be logically partitioned into two parts referred to as a forward-pass and backward-pass. In the forward-pass, one or more samples of vector $\hat{x}$ of measurement data (along with ground-truth data for the relevant formation property) is drawn from the posterior distribution. It is used to evaluate the cost function. In the backward-pass, gradient functions of the probability distribution of weights of the BNN are calculated via backpropagation so that their values can be updated by optimization of the cost function.

Figure 8:
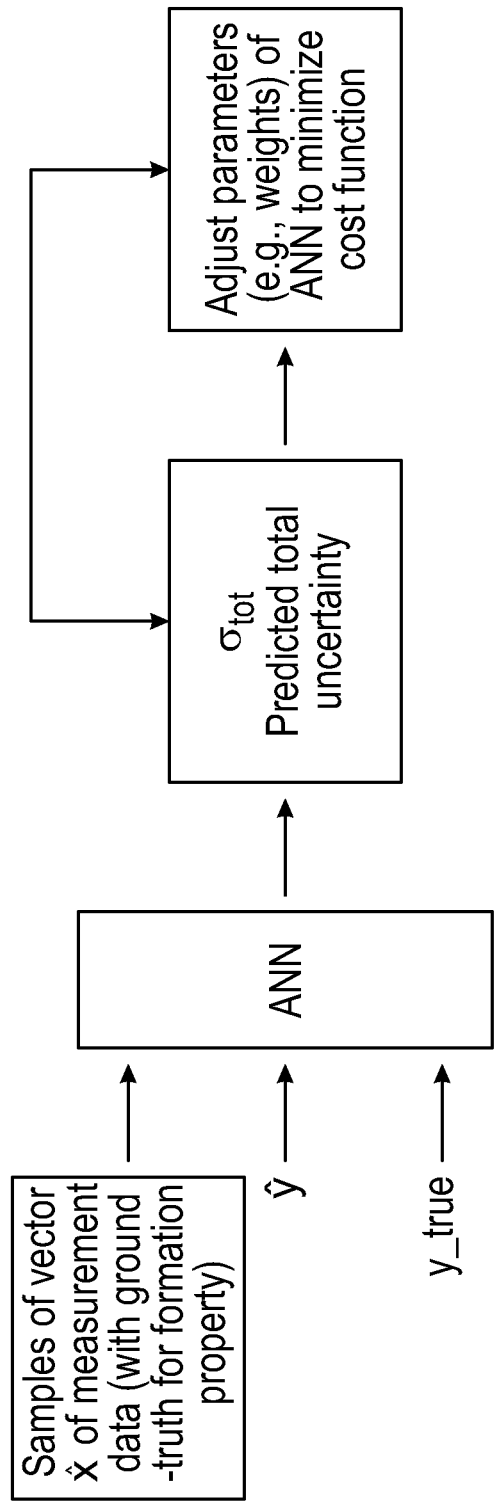
FIG. 8 is a diagram illustrating an example training iteration of the ANN of FIG. 6.

FIG. 8 illustrates a training iteration of the ANN where one or more samples of vector 2 of measurement data are supplied as training data (input) to the ANN. The predicted total uncertainty $\sigma_{tot}$ as output by the ANN and the error (or difference) between the ground-truth for the formation property data and the mean formation property data ($\hat{y}$) generated by the BNN for the same vector $\hat{x}$ of measurement data are used to compute a cost function. The parameters (e.g., weights) of the ANN are adjusted to minimize this cost function. This process can be repeated until the minimization of the cost function converges. This training iteration, including the sampling of the training data and parameter optimization operations of the ANN, can be repeated for a number of samples (or sample batches) of the vector $\hat{x}$ of measurement data. In embodiments, each training iteration of the ANN can be logically partitioned into two parts referred to as a forward-pass and backward-pass. In the forward-pass, one or more samples of the vector $\hat{x}$ of measurement data is drawn from the posterior distribution. It is used to evaluate the cost function. In the backward-pass, a gradient function of the weights of the ANN is calculated via backpropagation so that their values can be updated by optimization of the cost function. In the training phase, the vector $\hat{x}$ of measurement data can be applied to both the BNN and the ANN simultaneously or in a parallel manner.

In an inference phase after the neural network system of FIG. 6 has been trained, the BNN can be configured to infer or estimate the mean value ($\hat{y}$) and standard deviation ($\sigma_1$) of an unknown geophysical property given a vector $\hat{x}$ of measurement data as input. The standard deviation of the unknown geophysical as output by the BNN represents epistemic uncertainty $\sigma_1$ in the unknown geophysical property. The ANN can be configured to estimate the total standard deviation or total uncertainty $\sigma_{tot}$ in the unknown geophysical property given the same vector $\hat{x}$ of measurement data as input. The aleatoric uncertainty $\sigma_2$ of the unknown geophysical property can be determined from both the epistemic uncertainty $\sigma_1$ and the total uncertainty $\sigma_{tot}$, for example, according to the relation of Eqns. (3a) and (3b) above. The vector $\hat{x}$ of measurement data can be applied to both the BNN and the ANN simultaneously or in a parallel manner. The epistemic uncertainty $\sigma_1$ can be evaluated to automatically flag data as 'out of distribution' from new geologies that the model was not trained upon. The aleatoric uncertainty $\sigma_2$ is sensitive to heteroscedastic noise in the feature space arising from the combination of tool and geological conditions or environmental factors. Understanding both epistemic uncertainty $\sigma_1$ and aleatoric uncertainty $\sigma_2$ can aid in designing intelligent tools and applications such as automated log interpretation answer products for exploration and field development.

Note that in the inference phase a number of vectors $\hat{x}$ of measurement data obtained at varying well depths in the geological formation can be supplied to the neural network system of FIG. 6 in order to infer the mean value ($\hat{y}$) of the unknown geophysical property and the associated uncertainties (including epistemic uncertainty $\sigma_1$, aleatoric uncertainty $\sigma_2$ and total uncertainty $\sigma_{tot}$) for each one of the varying well depths in the geological formation. This analysis can be repeated for multiple wells of a geological formation and/or over different geological formations.

Figure 10:
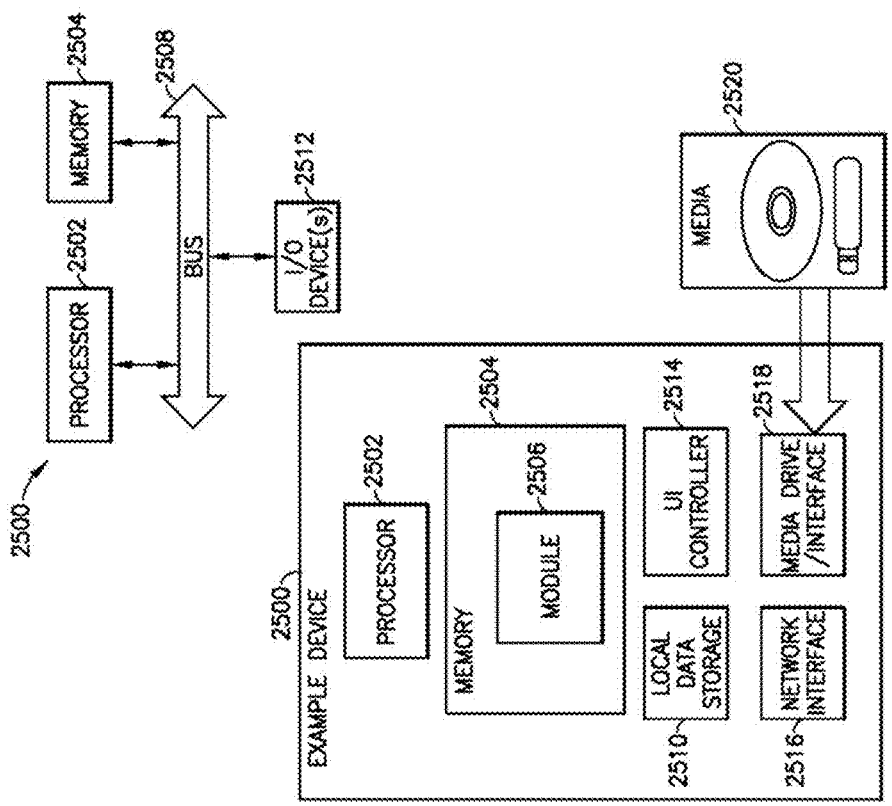
FIG. 10 is block diagram of an exemplary computer processing system.

FIG. 10 illustrates an example device 2500, with a processor 2502 and memory 2504 that can be configured to implement various embodiments of the neural network inference systems and associated training methods and workflows as discussed in this disclosure. Memory 2504 can also host one or more databases and can include one or more forms of volatile data storage media such as random-access memory (RAM), and/or one or more forms of nonvolatile storage media (such as read-only memory (ROM), flash memory, and so forth).

Device 2500 is one example of a computing device or programmable device and is not intended to suggest any limitation as to scope of use or functionality of device 2500 and/or its possible architectures. For example, device 2500 can comprise one or more computing devices, programmable logic controllers (PLCs), etc.

Further, device 2500 should not be interpreted as having any dependency relating to one or a combination of components illustrated in device 2500. For example, device 2500 may include one or more of computers, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth).

One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network.

A media drive/interface 2518 can accept removable tangible media 2520, such as flash drives, optical disks, removable hard drives, software products, etc. In one possible implementation, logic, computing instructions, and/or software programs comprising elements of module 2506 may reside on removable media 2520 readable by media drive/interface 2518.

In one possible embodiment, input/output device(s) 2512 can allow a user (such as a human annotator) to enter commands and information to device 2500, and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various systems and processes of present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer. Some of the methods and processes described above, can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, general-purpose computer, special-purpose machine, virtual machine, software container, or appliance) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although only a few examples have been described in detail above, those skilled in the art will readily appreciate that many modifications are possible in the examples without materially departing from this subject disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A neural network system comprising:
a first neural network configured to predict a mean value output and epistemic uncertainty of the output given input data;
a second neural network configured to predict total uncertainty of the output of the first neural network, wherein the second neural network is trained to predict the total uncertainty of the output of the first neural network given the input data through a training process involving minimizing a cost function that involves differences between a predicted mean value of a geophysical property of a geological formation from the first neural network and a ground-truth value of the geophysical property of the geological formation; and
one or more processors configured to run a software module that determines aleatoric uncertainty of the output of the first neural network based on the epistemic uncertainty of the output and the total uncertainty of the output.

2. The neural network system of claim 1, wherein:
the first neural network comprises a Bayesian neural network or an artificial neural network with dropout.

3. The neural network system of claim 1, wherein:
the second neural network comprises an artificial neural network or a Bayesian neural network.

4. The neural network system of claim 1, wherein:
the aleatoric uncertainty of the output of the first neural network is sensitive to heteroscedastic noise in the input data.

5. The neural network system of claim 1, wherein:
the first neural network is trained by minimizing a corresponding cost function that involves a corresponding ground-truth value of the output.

6. The neural network system of claim 1, wherein:
error of the first neural network is used to train the second neural network to learn a mapping between the input data and the total uncertainty of the output of the first neural network.

7. The neural network system of claim 1, wherein:
the input data is applied to both the first neural network and the second neural network simultaneously or in a parallel manner.

8. The neural network system of claim 1, wherein:
the first neural network is trained to predict a mean value and epistemic uncertainty of an unknown geophysical property of the geological formation given a vector of measurement data of the geological formation as input;
the second neural network is trained to predict total uncertainty of the unknown geophysical property of the geological formation given the vector of measurement data of the geological formation as input; and
the software module is configured to determine aleatoric uncertainty of the unknown geophysical property of the geological formation based on the epistemic uncertainty of the unknown geophysical property of the geological formation and the total uncertainty of the unknown geophysical property of the geological formation.

9. The neural network system of claim 1, wherein:
at least one of the first neural network or the second neural network is realized by the one or more processors.

10. A machine learning method comprising:
in a training phase, training a first neural network to predict an output and epistemic uncertainty of the output given input data, and training a second neural network to predict total uncertainty of the output of the first neural network, wherein the second neural network is trained to predict the total uncertainty of the output of the first neural network given the input data through a training process involving minimizing a cost function that involves differences between a predicted mean value of a geophysical property of a geological formation from the first neural network and a ground-truth value of the geophysical property of the geological formation; and
in an inference phase, supplying input data to the trained first neural network to predict an output and epistemic uncertainty of the output given the input data, using the trained second neural network to predict total uncertainty of the output of the trained first neural network, and determining aleatoric uncertainty of the output of the first neural network based on the epistemic uncertainty of the output and the total uncertainty of the output.

11. The method of claim 10, wherein:
the training phase further comprises using error of the first neural network to train the second neural network to learn a mapping between the input data and the total uncertainty of the output of the first neural network.

12. The method of claim 10, wherein:
the training phase further comprises applying the input data to both the first neural network and the second neural network simultaneously or in a parallel manner.

13. The method of claim 10, wherein:
the first neural network comprises a Bayesian neural network or an artificial neural network with dropout.

14. The method of claim 10, wherein:
the second neural network comprises an artificial neural network or a Bayesian neural network.

15. The method of claim 10, wherein:
the aleatoric uncertainty of the output of the first neural network is sensitive to heteroscedastic noise in the input data.

16. The method of claim 10, wherein:
the training phase further comprises training the first neural network by minimizing a corresponding cost function that involves a corresponding ground-truth value of the output.

17. A machine learning method for geological formation modeling comprising:
in a training phase, training a first neural network to predict a mean value and epistemic uncertainty of an unknown geophysical property of a geological formation given a vector of measurement data of the geological formation as input, and training a second neural network to predict total uncertainty of the unknown geophysical property of the geological formation given the vector of measurement data of the geological formation as input, wherein the training phase further comprises training the second neural network by minimizing a cost function that involves differences between a predicted mean value of the unknown geophysical property of the geological formation from the first neural network and a ground-truth value of the unknown geophysical property of the geological formation;
in an inference phase, supplying at least one vector of measurement data of the geological formation to the trained first neural network to predict a mean value and epistemic uncertainty of the unknown geophysical property of the geological formation, using the trained second neural network to predict total uncertainty of the unknown geophysical property of the geological formation, and determining aleatoric uncertainty of the unknown geophysical property of the geological formation based on the epistemic uncertainty and the total uncertainty of the unknown geophysical property of the geological formation.

18. The method of claim 17, wherein:
the aleatoric uncertainty of the unknown geophysical property of the geological formation is sensitive to heteroscedastic noise in the measurement data of the geological formation.

19. The method of claim 17, wherein:
the first neural network comprises a Bayesian neural network or an artificial neural network with dropout.

20. The method of claim 17, wherein:
the second neural network comprises an artificial neural network or a Bayesian neural network.

21. The method of claim 17, wherein:
the training phase further comprises training the first neural network by minimizing a corresponding cost function that involves a corresponding ground-truth value of the unknown geophysical property of the geological formation.

22. The method of claim 17, wherein:
at least one of the first neural network and the second neural network is realized by a processor.

23. The method of claim 17, wherein:
the training phase further comprises applying the vector of measurement data of the geological formation to both the first neural network and the second neural network simultaneously or in a parallel manner.

24. The method of claim 17, further comprising:
performing the operations of the inference phase are performed over a plurality of vectors of measurement data of the geological formation at varying depths to predict the geophysical property of the geological formation and associated epistemic uncertainty and aleatoric uncertainty at the varying depths.

* * * * *